Figure 1:
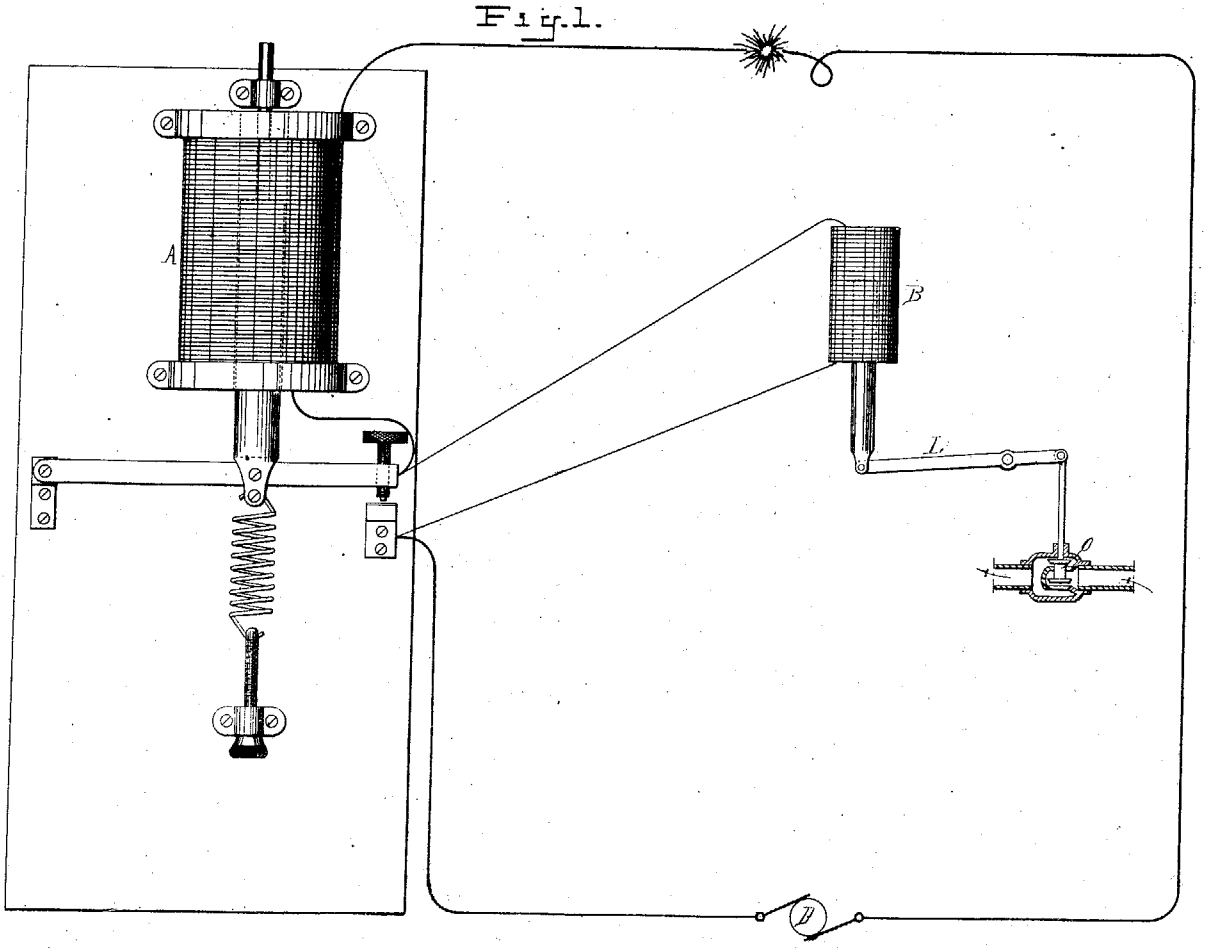

4 Sheets—Sheet 1.

D. HIGHAM.

Assignor to the HIGHAM PATENT RIGHT COMPANY.

REGULATION OF ELECTRIC ARC LIGHT CIRCUITS.

No. 11,108. Reissued Aug. 26, 1890.

WITNESSES:

George Baumann

John Revell

INVENTOR

Daniel Higham

BY

Howson and Howson

ATTORNEYS

D. HIGHAM.

Assignor to the HIGHAM PATENT RIGHT COMPANY.

REGULATION OF ELECTRIC ARC LIGHT CIRCUITS.

No. 11,108. Reissued Aug. 26, 1890.

WITNESSES:

George Bannam
John Revell

INVENTOR
Daniel Higham
BY
Howson and Howson
ATTORNEYS

4 Sheets—Sheet 3.

D. HIGHAM.

Assignor to the HIGHAM PATENT RIGHT COMPANY.

REGULATION OF ELECTRIC ARC LIGHT CIRCUITS.

No. 11,108. Reissued Aug. 26, 1890.

WITNESSES:

George Baumann

John Revell

INVENTOR

Daniel Higham

BY

Howson and Howson

ATTORNEYS

4 Sheets—Sheet 4.
D. HIGHAM.
Assignor to the HIGHAM PATENT RIGHT COMPANY.
REGULATION OF ELECTRIC ARC LIGHT CIRCUITS.
No. 11,108. Reissued Aug. 26, 1890.
Fig. 6.
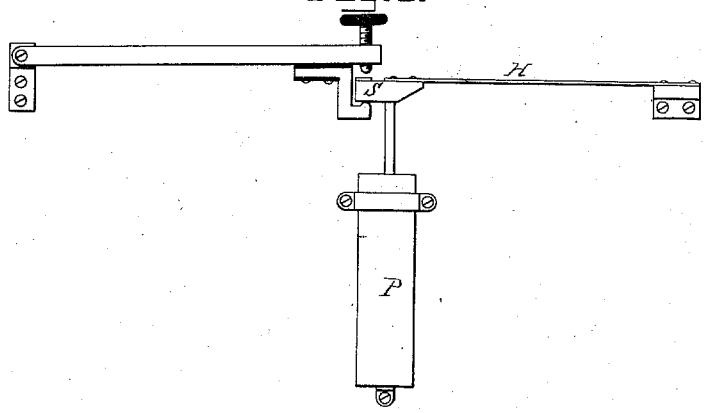
Fig. 7.
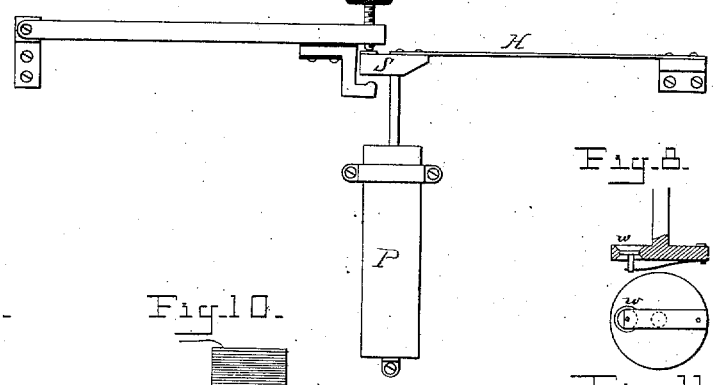
Fig. 8.
Fig. 9.
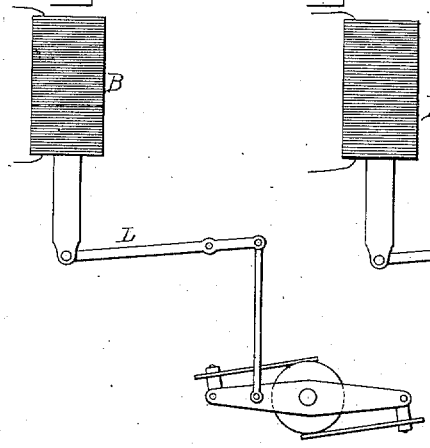
Fig. 10.
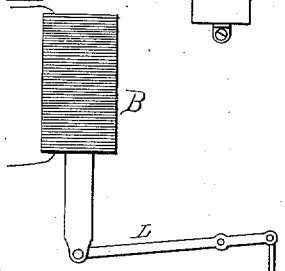
Fig. 11.
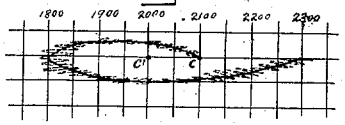
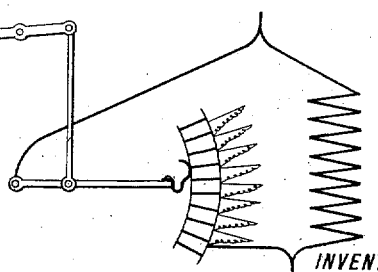
WITNESSES:
George Baumann
John Revell
INVENTOR
Daniel Higham
BY
Howson and Howson
ATTORNEYS

UNITED STATES PATENT OFFICE.

DANIEL HIGHAM, OF BOSTON, MASSACHUSETTS, ASSIGNOR TO THE HIGHAM PATENT RIGHT COMPANY, OF ROCKLAND, MAINE.

REGULATION OF ELECTRIC-ARC-LIGHT CIRCUITS.

SPECIFICATION forming part of Reissued Letters Patent No. 11,108, dated August 26, 1890.

Original No. 432,310, dated July 15, 1890. Application for reissue filed August 1, 1890. Serial No. 360,722.

*To all whom it may concern:*

Be it known that I, DANIEL HIGHAM, a citizen of the United States, and a resident of Boston, in the county of Suffolk, in the State of Massachusetts, have invented certain new and useful Improvements in the Regulation of Electric-Arc-Light Circuits, of which the following is a specification.

This invention relates to the regulation of arc-light dynamos; and its object is to so provide for the regulation that this class of dynamos can be made much cheaper and at the same time more efficient than has been heretofore permissible.

All arc-light dynamos with which I am acquainted are constructed with a large amount of armature and field-magnet windings to a small amount of iron in the armature and field-magnet cores—that is, they are so designed that by working up to the degree of magnetic saturation an increase of current above the normal will either drop or else not increase the potential at the terminals of the dynamo. This of course is independent of any movement of a regulator. It is well known in the art, however, that such dynamos will cost more to manufacture and be much lower in efficiency than dynamos constructed with a small amount of wire windings to a relatively large amount of iron in the magnetic circuit; but nevertheless such dynamos are purposely so designed, and for no other reason than to insure stability of current in the working-circuit. The necessity of this design is due, first, to the peculiar properties of an arc light; secondly, to the nature of a series-wound dynamo, and, thirdly, to the action of the regulator itself.

Whenever attempts have been made to run arc-light dynamos with unsaturated magnets, they have always met with most discourging results, due to the instability of the current. In order that this shall be made more apparent, it will be well to point out some of the peculiarities referred to. In the first place the resistance of an arc will fall when the current rises and rise when the current falls, which, as will be understood, is just the reverse action to what would be desired for the stability of current. The change of resistance in the arc is no small variation, it falling more than half when the current is doubled and rising more than double when the current is halved. Not even when the feeding mechanism in the lamp is extremely sensitive can the resistance be kept from varying. In fact the feeding mechanism is generally so far behind in its movement as to make the variation even more than would be the case if the arc were kept at a fixed length.

It will be obvious from the above that in order to insure stability of current the potential at the terminals of an arc-light dynamo should drop when the current rises, and it is to accomplish this that these dynamos are worked up to the dip of the curve—*i. e.*, to the degree of magnetic saturation—where the potential at the terminals of the dynamo will either drop or not increase by an increase of current. From this the failure to work dynamos with unsaturated magnets can be understood. For if the dynamo were a series-wound machine (which is the only successful winding for high-tension dynamos) and had unsaturated magnets an increase of current would raise the intensity of the magnetic field, thereby increasing the voltage, which, as will be understood, is also the reverse of what would be desired for the stability of current.

When an arc-light dynamo is provided with any of the regulators now known to the art, the potential at the terminals of the dynamo will of course drop when the current increases; but this is of no avail for the stability of current, for while the regulator will drop the potential when the current rises it will always (when regulating an unsaturated machine) drop it too far, as I shall presently describe. No matter how little this may be beyond the conditions of stability, it will be added to each oscillation of the regulator, finally multiplying up until there is a great "surging" of current. The lamps will first drop down the carbons and then draw them apart, while the regulator will work from one extreme to the other, first raising up the current and then cutting it down. This phenomenon, which always comes with an increase of iron in the dynamo beyond a certain limit, has too often been met with to need further description here. It is the object of this invention, however, to produce a regulator which will effect the conditions of stability without resorting to the oversaturation of the magnets, or, in other words, to the costly and inefficient design of machine, which has heretofore been compulsory.

Figure 1 in the drawings represents, partly in diagram, a slightly-modified but well-known form of regulator.

Figure 2:
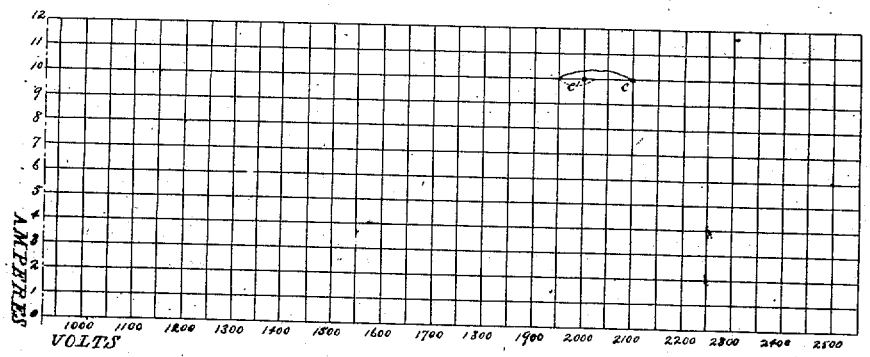
Figure 3:
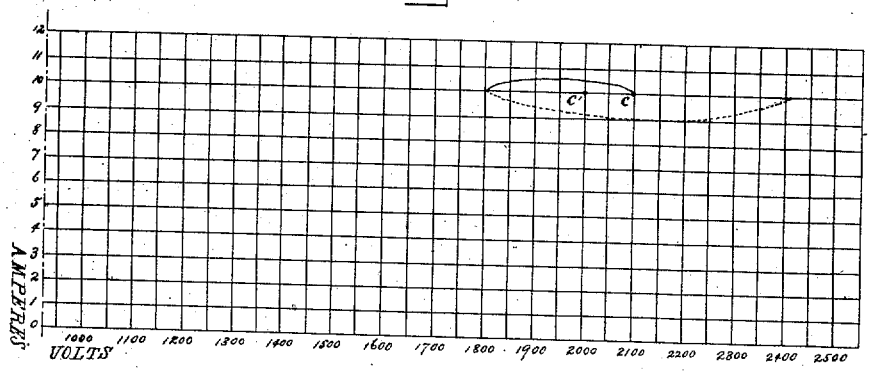
Figure 4:
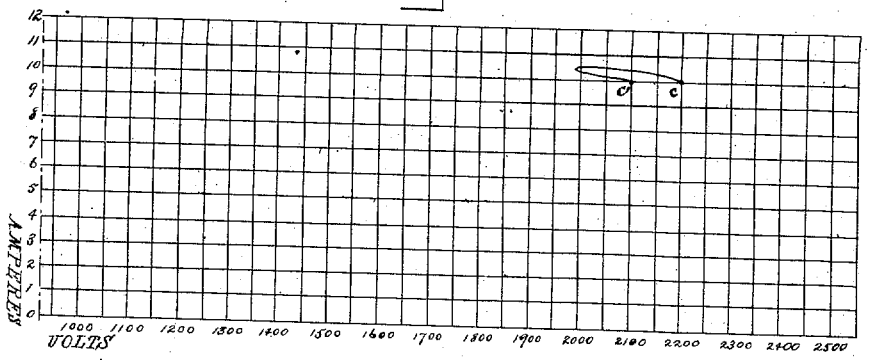

A is a controlling electro-magnet, the windings of which are connected in the working-circuit. B is an electro-magnet to move an arm L, according as the magnet A opens or closes the short circuit around the magnet B, as will be understood. The movement of the arm L of course may effect the regulation in various ways, as by shifting the commutator-brushes or varying the excitation of the field-magnet or by controlling the power of the motive engine to vary the speed of the dynamo-armature. In Fig. 1 I have shown a valve O as connected to the arm L to represent this last method of regulation, while to represent the two former methods of regulation I have in Figs. 9 and 10 shown the arm L as connected to commutator-brushes, Fig. 9, and as controlling a variable resistance, Fig. 10, in a shunt around the field-magnet coils. Figs. 2, 3, and 4 are diagrams showing curves to illustrate the variations of current and potential at the terminals of the dynamos when a change of resistance takes place. Such a curve I shall herein call the "regulation curve." The horizontal lines in the diagram represent the intensity of the current in ampères, while the vertical lines represent the potential in volts.

Imagine a dynamo provided with the regulator shown in Fig. 1 to be supplying a current to a circuit of arc lights and the system to be running steadily at ten ampères and two thousand one hundred volts. If under these conditions two arc lights of fifty volts each should be cut out of the circuit, it will be known mathematically that the potential will have to drop to two thousand volts to keep the current at ten ampères. Such a mathematical point in the adjustment I shall herein call the "theoretical adjustment." This adjustment, however, is never accomplished by any of the arc-circuit regulators now in use. This can be better understood by referring to Fig. 2, which represents the regulation curve of a saturated machine. Imagine the whole to be running steadily under the conditions indicated at *c* in the diagram, and suppose the two arc lights be then cut out of the circuit. Of course the current will rise, and if the regulator is sensitive enough to operate within one per cent. variation of current the potential will at this point start to drop; but the current will rise above this before the potential will have dropped to two thousand volts. If at this point the current has started to fall, as shown in the diagram, the conditions of stability will have been accomplished, notwithstanding the fact that the potential will have to keep on dropping until the current falls below normal before the magnet A can open the short circuit around the magnet B to move the regulating mechanism (valve of the steam-engine or commutator-brushes, &c.) to check the fall of potential. From the curve in the diagram it will be seen that by the time the current has dropped to normal the potential has dropped to about nineteen hundred and fifty volts, which, although beyond the theoretical adjustment, which is indicated at *c'*, is within the conditions of stability. For instance, when the dynamo was running at two thousand one hundred volts and the two lamps of fifty volts each were cut out, there was left a five-per-cent. surplus of volts over the theoretical adjustment, while after the movement of the regulator there was only about two and one-half per cent. of volts less than the theoretical adjustment, and as the two and one-half per cent. below is nearer the theoretical adjustment than the five per cent. above the regulator is operating within the conditions of stability. The dotted curve below the normal line represents the reverse movement of the regulator, which of course is still nearer to the theoretical adjustment. These are the conditions of stability of all arc-light dynamos now in use—namely, the use of saturated magnets and sufficient resistance in the windings to drop the potential when the current rises, in order that the current shall start to drop before the theoretical adjustment takes place. These conditions of stability will probably be better understood by describing the conditions of unstability of an unsaturated dynamo.

Fig. 3 represents the regulation curve of an unsaturated dynamo. Supposing, as before, the whole to be running under the conditions indicated at *c* in the diagram, and then the two arc lights of fifty volts each to be cut out, the first effect will be, as before, a rise of current, and the regulator will move to drop the potential. In this case, however, there will not be sufficient electrical resistance in the dynamo to drop the potential; but the rise of current will increase the potential, for if the magnets are unsaturated the intensity of the magnetic field will be increased by an increase of current, thereby increasing the voltage. If therefore the current shall rise (say for clearness of illustration) five per cent. above normal, the regulator then, in order to compensate for the increased intensity of the magnetic field, will have to move to an adjustment which would normally represent nineteen hundred volts before the current will be only checked from rising farther. At this point the regulator will continue to drop the potential until the current falls below normal, when the potential will have dropped, as I have shown in the diagram, to about eighteen hundred volts, which is beyond the conditions of stability. In other words, the five-per-cent. surplus of volts left by cutting out the two lamps has been reduced by the regulator to ten per cent. of volts below the theoretical adjustment, which of course is farther from the theoretical adjustment than before the regulator moved at all. The dotted curve represents the reverse movement of the regulator, from which the phenomenon of unstability will be apparent.

Diagram Fig. 4 represents the regulation curve that should be made by a regulator of an unsaturated dynamo when subjected to the same conditions as above, in order to insure stability of current. From this it will be seen that the rise of current has been checked, as before, by a drop of potential; but as distinguished from the curve in the diagram Fig. 3, almost as soon as the current has started to drop the potential has started to rise, and when the current has fallen to normal the potential has reached two thousand volts, or the theoretical adjustment, which is the maximum condition of stability, as will now be understood.

Figure 5:
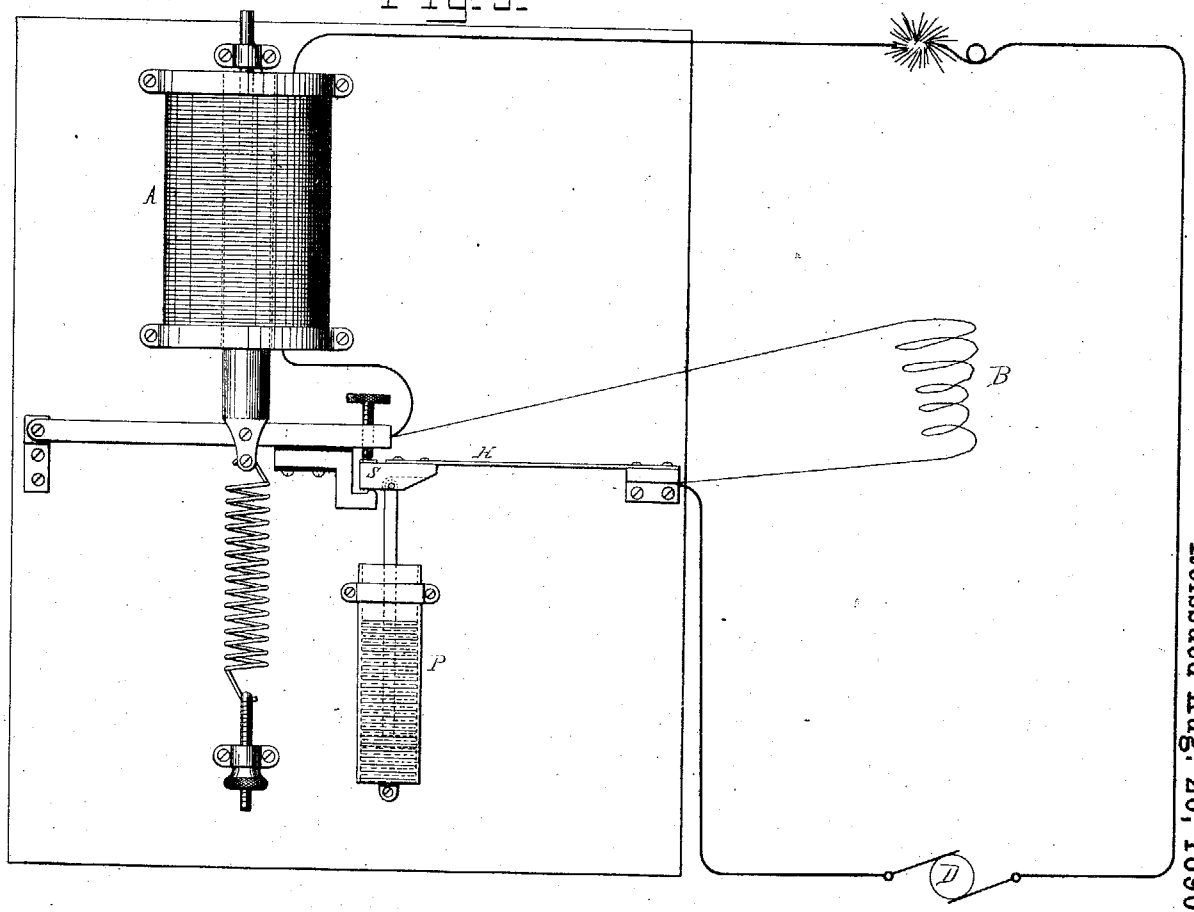

In Fig. 5 I have shown a regulator for carrying out this method of regulating and stabling the current for unsaturated dynamos, or, in other words, as graphically represented in the diagram, Fig. 4. This regulator I have shown, for the sake of clearness, precisely the same as that illustrated in Fig. 1, with the exception of certain additional and distinguishing features—namely, a movable contact S, a spring H, and a dash-pot P. The function of the spring H will be to keep the contact S somewhere near the normal position, which is the position shown in Fig. 5, while the dash-pot P, which should be just strong enough to yield very slowly under the action of the spring H, will be to keep the contact S in any position it may be placed for an appreciable time.

The operation of this regulator is as follows: Referring to the diagram, Fig. 4, suppose the dynamo to be running steadily under the conditions indicated at *c* and the regulator to be working at the position shown in Fig. 5, and that then two arc lamps are cut out, as before. The first rise of current will cause the magnet A to open the short circuit around the magnet B, as was the case with the regulator shown in Fig. 1; but, as distinguished from the regulator shown in Fig. 1, the rise of current after the short circuit has been opened (which is represented in the diagram to have risen to about five per cent. above normal) will pull up the contact S, as shown in Fig. 6, where it will be held by means of the dash-pot P, so that the short circuit around the magnet B will be closed almost as soon as the current starts to return to normal, whereby the potential can be raised to the theoretical adjustment by the time the current reaches normal, as illustrated by the curve shown in the diagram Fig. 4. This adjustment of the regulator, which would be the ideal one, could be accomplished, yet it should be understood that it is not necessary for the regulator to effect a theoretical adjustment the first oscillation. So long as every oscillation of the regulator will effect an adjustment nearer to the theoretical adjustment than the preceding one the conditions of stability will be obtained, as I have explained above.

By the word "normal" as used in this specification in connection with the current I mean that intensity of current at which the regulator is intended to maintain it constant.

Fig. 7 shows the contact S as pulled down, which will be the case when a fall of current occurs, whereby the short circuit can be opened without the current having to rise to normal, as will be understood.

To make this device more effective, the piston of the dash-pot should be provided with a small relief-valve *w*, as I have shown, for instance, in Fig. 8. Such a valve should be just strong enough not to open by the action of the spring H, yet delicate enough to open by the action of the magnet A, in order that the contact S can be readily pulled up or down.

This invention is not limited to any one form of device to accomplish this method of stabling the current of unsaturated dynamos, for other forms could be easily devised by any one skilled in the art by the aid of the foregoing explanation of my invention.

What I wish to claim as my invention or discovery is the method I have herein disclosed for stabling arc-circuit currents—that is to say, dropping the potential when the current rises above normal and then raising it while the current is still above normal, as I have illustrated in diagram Fig. 4, which is the condition of stability of an unsaturated dynamo, as I have clearly set forth above.

In all methods of regulating arc-circuit currents now in use when the regulator is adjusted to give a practically-constant current throughout the working limits the regulator will not raise the potential when the current is above normal until the current falls below normal, as I have illustrated in diagram Fig. 3, which is the condition of unstability, as I have above explained, of an unsaturated dynamo.

I have described my invention, for the sake of illustration, as effecting the conditions of stability for the current only when the lamps are cut out of the circuit; but it should be understood that the current will have to be also stable when a fixed number of lamps are kept burning. Under such conditions the current will take an oscillating or wave-like motion of about two or three per cent. variation, according to the sensitiveness of the regulator, and on the rise and fall of each of these little waves of current the regulator will by my invention raise the potential while the current in any of these oscillating movements is above normal and drop the potential while the current is below normal.

It may sound somewhat inaccurate or obscure to speak of saturated magnets in dynamos where the regulation is accomplished by varying the intensity of the magnetic field, for it would seem that in order to vary the magnetic intensity the magnets must necessarily be below saturation. It may be well to mention, therefore, that in all dynamos of this type the magnets are always saturated when working at full load, and the range of regulation is restricted when supplying arc lights purely to variations along the bend of the "saturation curve." In cases where the range of regulation extends below the bend of the curve the armature and line resistance is either extremely high, or else incandescent lamps or other devices not possessing the peculiarities of an arc light are supplied in the circuit. In other cases the regulation is not adjusted to give a constant current throughout the range of regulation, but is adjusted to give ten or fifteen per cent. more current under light load than under full load, whereby stability will be more or less effected at a sacrifice of regulation. With my method of regulating and stabling the current, however, I can supply a purely arc-light circuit from an unsaturated dynamo and keep the current at a constant intensity throughout the whole range of regulation. It may also be confusing to speak of raising and dropping the potential in reference to the current when it is known that in almost all arc circuits the electro-motive force, for various reasons, is continually jumping up and down. For instance, dynamos with open-coil armatures and a small number of commutator-segments will keep up a continual fluctuation of the electro-motive force in the circuit. Again, there are regulators that when regulating raise and lower the potential step by step, as it were. In such cases (say, for illustration) if the dynamo were an unsaturated dynamo and were subjected to the same conditions for regulation as herein mentioned, a curve would then be drawn similar to the one I have indicated by dotted lines in Fig. 11. Now it will be seen from this curve that while the potential will be both raised and dropped when the current is above or below normal, respectively, the mean potential will be precisely as I have shown in Fig. 3. It should therefore be understood that by all the curves herein shown and in the references made to them as to variations of potential is meant the variation of mean potential. While the potential may fluctuate more or less with different regulators now known to the art, with no regulator has the potential—that is, the true or mean potential—been lowered to check a rise of current and then raised again while the current is above normal, as I have herein disclosed, for the purpose of regulating or stabling the current of an unsaturated dynamo.

I claim as my invention—

1. The mode herein disclosed for regulating and stabling arc-circuit currents at a constant intensity, said mode consisting, when the current rises above normal, in first dropping the potential to check the rise of current and then raising the potential while the current is still above normal, or, when a fall of current occurs, in first raising the potential, but dropping it again while the current is below normal, all substantially as described.

2. The combination of a dynamo-electric generator and an arc-light circuit supplied with current from said generator, a regulator controlling the current at a constant intensity, and means, substantially as described, to drop the potential when the current rises above normal and then raise the potential again while the current is above normal, or, when the current falls below normal, to raise the potential and then drop it again while the current is below normal, all substantially as described.

DANIEL HIGHAM.

Witnesses:
ISAAC F. PAUL,
WILLIAM F. PERRY.